Oct. 31, 1933.  J. L. SCHWARTZ  1,933,283
HYGROMETER
Filed Aug. 1, 1928   2 Sheets-Sheet 1
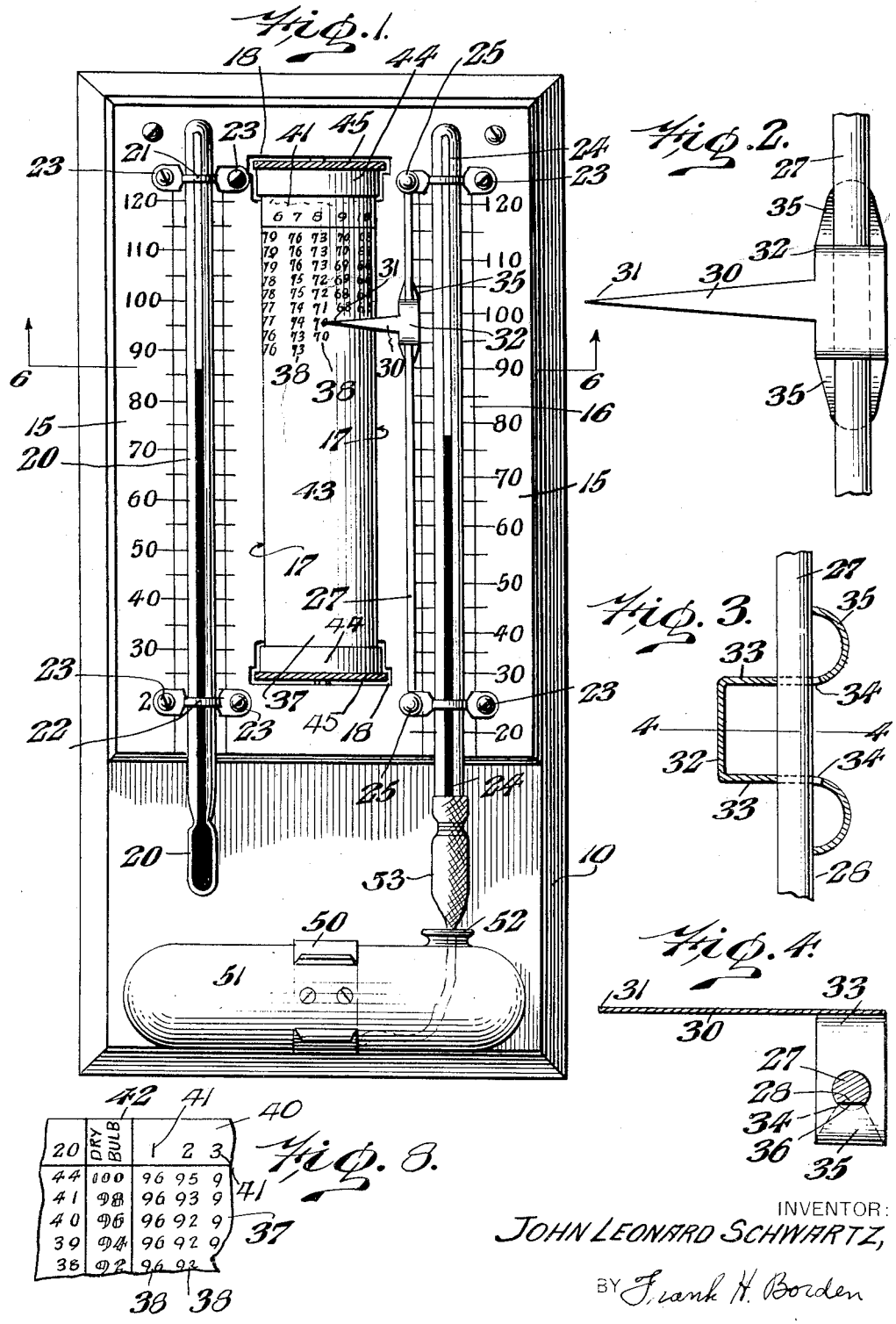
INVENTOR:
JOHN LEONARD SCHWARTZ,
BY Frank H. Borden
ATTORNEY.

Oct. 31, 1933. J. L. SCHWARTZ 1,933,283
HYGROMETER
Filed Aug. 1, 1928 2 Sheets-Sheet 2
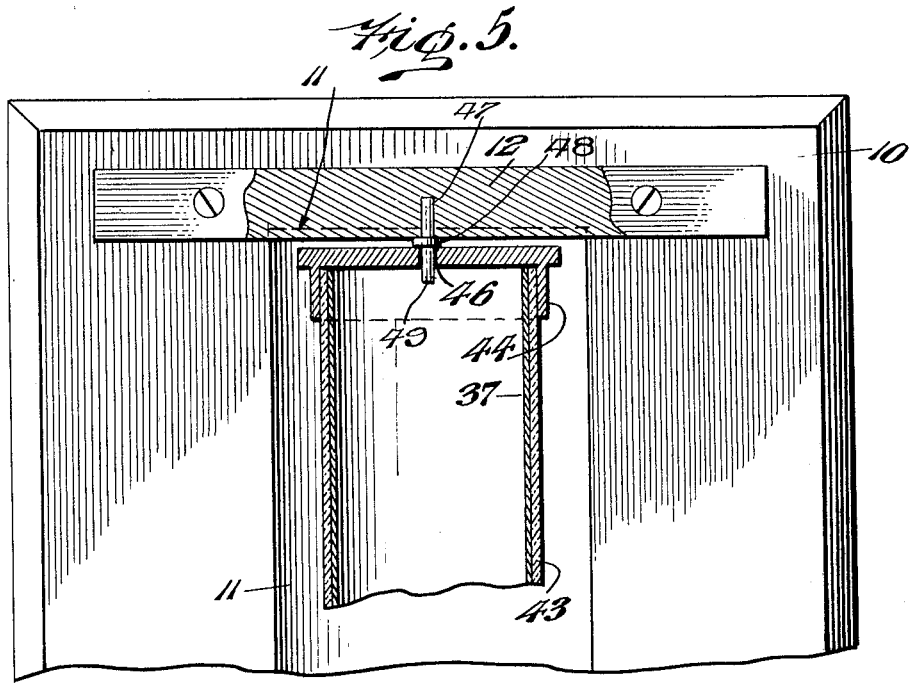
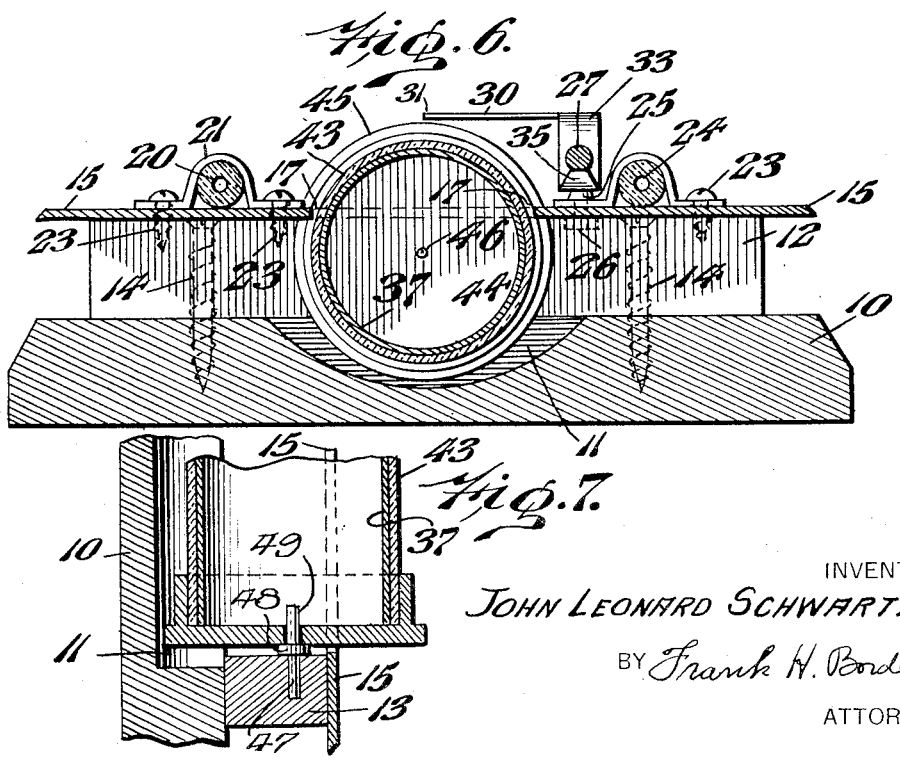
INVENTOR:
JOHN LEONARD SCHWARTZ,
BY Frank H. Borden
ATTORNEY.

Patented Oct. 31, 1933

1,933,283

UNITED STATES PATENT OFFICE 1,933,283

HYGROMETER

John Leonard Schwartz, Philadelphia, Pa., assignor to Philadelphia Thermometer Co., Philadelphia, Pa., a copartnership composed of John Leonard Schwartz, George W. Rossman, and Clarence A. Rossman Application August 1, 1928. Serial No. 296,738

4 Claims. (Cl. 73—24)

This invention relates to hygrometers, pertaining more particularly to hygrometers for domestic and household uses.

Hygrometers as provided in the past have been technical instruments, possessed neither of simplicity nor of ornamentality and having no appreciable part in the lives of non-technical persons. However, with the increase in knowledge of artificial heating in dwellings and such, and of the desirability of adequate moisture in the artificially heated atmosphere, it has become necessary to devise an improved instrument enabling the layman to determine the humidity of the air in a minimum of time and with ease and simplicity.

Among the objects of the invention are; to simplify and reduce the cost of construction of hygrometers; to provide a hygrometer of such simplicity of construction and directness of action as to be available to a layman; to associate a chart with a movable pointer in a hygrometer whereby the moisture content of the atmosphere may be readily ascertained; to improve the supporting means for a chart of a hygrometer; to provide a hygrometer with a chart in a moisture excluding cylinder; to provide a hygrometer the essential working elements of which are in a substantial plane and so arranged that the instrument may be suspended from a wall and which is completely operable from the front of the instrument; to provide a hygrometer with moisture determining elements such that a reading may be retained for purposes of comparison with a later reading; to effect a color coordination between a chart and a thermometer of a hygrometer whereby readings of the chart by the unskilled is facilitated; to provide a hygrometer with movable parts of such relation that wear incident to friction cannot affect the accuracy of the readings; to improve the appearance of hygrometers; and many other objects and advantages as will be further pointed out.

In the accompanying drawings,

Fig. 1 represents a front elevation of the preferred form of hygrometer according to this invention, Fig. 2 represents a front elevation of the adjustable pointer and a fragmentary portion of the guide rod forming the support thereof, on an enlarged scale, Fig. 3 represents a side elevation of the same, partly in section Fig. 4 represents a horizontal section of the same taken on line 4—4 of Fig. 3, Fig. 5 represents a fragmentary enlarged detail section of the support for the upper end of the cylindrical chart.

Fig. 6 represents a horizontal section through the preferred form of hygrometer taken on line 6—6 of Fig. 1, Fig. 7 represents a fragmentary transverse section through the lower end of the cylindrical chart and its support, Fig. 8 represents a fragmentary elevation of the preferred form of chart disclosing the related columns of figures carried thereby.

The hygrometer of this invention in the preferred form includes a back board or base 10, arranged to be placed in juxtaposition to a wall and supported therefrom through hooks or such devices carried by the base. The base is characterized by a groove or channel 11 formed in the front face of slightly greater length than the cylindrical chart to be described. Spacing strips 12 and 13 respectively are rigidly connected to the base at the upper and lower edges of the concavity 11, and are disposed in spaced horizontal planes, extending substantially the width of the base. These may be of wood or composition material and are attached as by means of screws 14.

The spacing strips provide spaced supports for the plate 15, mounted on the strips in parallel spaced relation to the plane of the base 10. The plate 15 is preferably of metal and is of rectangular outline such as to overhang the spacing supports slightly at the ends and at the sides as well. The plate is provided with vertical columns of graduations 16 respectively adjacent the side borders or margins, and is provided centrally with a vertical slot 17 of uniform diameter or extent throughout its length except at the ends which are enlarged as at 18. On one side of the plate from the central slot or opening, the dry bulb thermometer 20 is affixed in calibrated relation to the graduations 16, and permanently secured in proper adjusted position by clamps 21 and 22 affixed to the plate 15 and embracing the thermometer tube. Clamps 21 and 22 may be affixed to the plate by screws 23 passing through appropriate openings in the clamps into threaded holes in the plate, or may be continued into the spacing strips 12 and 13 as means for attaching the plate to the spacing strips. It is preferable that one screw be used to affix the clamp to the plate, and another to affix the clamp, plate and spacing strip together, as by this means the thermometer tube is held to the plate during the detached manipulations of the plate in securing the proper mounting thereof. The thermometer 24, of the wet bulb character, is similarly affixed to the other side of the plate 15, and held in place by similar clamps and screws. In this case however, it is to be noted that the sides of the clamp adjacent the slot or opening 17 are held to the plate by screw posts 25, connected on the opposite side of the plate by small nuts, 26, which posts are each provided with a lateral opening in which a rod 27 is received and firmly held. The rod has a flat side, 28, and extends substantially the same distance as the length of the slot parallel with the wet bulb thermometer.

The rod 27 is arranged with the flat face downwardly disposed in a plane substantially parallel with the face of the plate 15, and forms a guide for the vertically adjustable finger or pointer 30. The pointer has a free end 31, and the rod engaging clip end 32, the latter comprising an integral generally U shaped clip having legs 33 formed with registering round holes 34 through which the rod is inserted and upon which the pointer is slid vertically, and the legs 33 terminate in up-turned spring fingers 35, the flat or straight edges 36 of which resiliently and frictionally engage the flat surface 28 of the rod 27. It will be understood that the pointer 30 is resiliently maintained in a plane substantially parallel with the face of plate 15, that it maintains an adjusted vertical position owing to the frictional engagement of the spring arms with the lower surface of the rod 27, thus enabling comparisons between serial readings. The free end 31 extends over the slot 17 in plate 15 and terminates in a point substantially in the middle of the slot, and the pointer is capable of oscillation about the rod as an axis against the resilience of the spring arms of the clip in engagement with the flat surface of the rod. This is of advantage in ascertaining readings from the chart to be described, inasmuch as the pointer is normally supported and maintained in a spaced relation to the surface of such chart, but under pressure from a finger of the operator the pointer may be depressed into contact with the chart for the definite reading of the appropriate column of the chart, but which returns instantly to its normal spaced relation upon the release of the pressure, thus permitting free rotation of the chart, out of contact with the pointer. If desired also the pointer may be oscillated about the rod away from the plate into contact with the wet bulb thermometer, if that is the thermometer adjacent the rod 27, as is preferred.

The general principles of hygrometers of the wet and dry bulb type are, of course, well known. It is known that tables of relative humidity have been worked out based upon the difference in degrees of temperature between the wet and dry bulb thermometers, but so far as known such charts have been either detached from the instrument or have been associated with it in such manner as to present an unsightly, technical and, from a commercial viewpoint, thoroughly impracticable device. It is of importance in the present invention that the chart be small, compact, quickly readable and such as to enhance the ornamental aspect of the instrument.

To these ends therefor a chart 37 is provided, having columns of figures arranged at right angles, comprising vertical columns of figures as 38, terminating in an upper marginal horizontal strip or space 40, in which figures representing the difference in degrees between the wet and dry bulb readings head the vertical columns 38, as at 41. A starting column 42, is provided which is read vertically downward from the marginal portion bearing a legend such as "Dry bulb reading", or "Red bulb", etc., and which column of figures is preferably printed or formed in a color in contrast with the other columns of figures, and which color is coordinated with the color of the material of the dry bulb thermometer so that the mere association of the color features will enable the layman to note the dry bulb reading, turn the chart to the column for the dry bulb thermometer reading, then position the pointer vertically so that the end 31 is in line with the appropriate temperature listing of that column, then turn the chart until the proper figure 41 in the upper margin is reached, and the humidity will be found registering with the end of the pointer. This will be further explained, although it seems clear from the disclosure.

It will be obvious that such chart 37 is preferably printed upon paper or such material, but that with the exposure to moisture to which hygrometers are susceptible, the effect on paper would be undesirable, not only as affecting the ornamental aspect of the chart, which should retain its fresh appearance, but also from the standpoint of curling and wrinkling the paper, so distorting it as to render it incapable of correct use. To this end, and to effect a compact structure the chart is housed in a substantially moisture proof housing or support, preferably constructed as follows. The chart is rolled and pasted along the meeting and lapped edges within a glass cylinder, preferably, as 43. The glass cylinder is provided with caps 44, preferably of metal, having knurled flanges 45, which are glued or pasted to the glass to provide a tight fit. This connection is substantially watertight, and is completely moisture proof. Each cap is provided with a small axial bore 46.

Small pivot pins 47, having flanges 48, are driven into the respective spacing strips, and the free ends 49 of the pins are received with a tight bearing engagement in the appropriate bores 46 in the respective caps. This engagement is such as to permit free rotation but to effectively seal the openings into the glass cylinder 43. The flanges 48 are in engagement with the external faces of the respective caps to facilitate the sealing of the opening in the caps.

With the cylindrical chart thus formed in position, the main body of the chart is below the plate 15, with a small portion, relatively, extending into the slot 17 of the plate with sufficient clearance to enable free rotation without unsightly spaces about the cylinder.

The lower portion of the base 10 has a clamp or clip 50 within which a bottle or reservoir 51 with neck opening 52 may be horizontally slid and maintained, with the neck in substantial registry with the bulb of the wet bulb thermometer, so that a wick 53 may extend from said bulb into the bottle.

Note the protection against breakage accorded the cylinder by its location relative the slot in the plate.

The operation of the instrument is essentially simple. Assuming for example that the readings of the respective thermometers are as indicated, namely that of the dry bulb at 86°, and that of the wet bulb at 78°, the chart is rotated until the coordinated colored column of figures is exposed at substantially the center of the chart, the pointer is moved vertically against the frictional resistance of its support until the free end 31 is over the dry bulb reading of 86. The chart is then rotated upon its axis, with relation to the stationary pointer until the numeral in the upper margin of the chart corresponding to the difference between the wet and dry bulb readings is reached, namely 8, at which point the rotation is stopped and the eye follows the column down until it is arrested by the end of the pointer designating 70, which is the percentage of moisture in the surrounding atmosphere. The pointer and chart may be permitted to remain stationary until the next reading is to be obtained, for purposes of comparison therewith.

It is pointed out that there are but the two moving elements, the rotatable chart, and the vertically slidable pointer. It is of importance to note, moreover, that if there is wear on any part of the instrument as an incident of friction, it can have no effect whatever on the accuracy of the readings. This is in contrast to those devices utilizing links and levers relative a stationary chart, and to those utilizing a movable chart relative a fixed indicator, in either case wear upsets or destroys the original calibrations and renders the instrument inaccurate.

It is believed that the simplicity, accuracy, economy, ornamentality and thoroughly practical nature of the instrument will be obvious.

I claim as my invention:

1. In a hygrometer, a base and a plate in parallel spaced relation, horizontal strips interposed between the plate and the base to maintain the spaced relation, said plate having a vertical slot and the base having a channel, the slot being of substantially uniform width throughout its length but being enlarged at the ends, pivot pins mounted on the strips between the plate and the base, a cylindrical tube bearing data, a glass tube closely embracing the cylindrical tube of data, knurled flanged caps sealed to the glass tube and having small axial bores in which the said pivot pins engage to seal the glass tube against the passage of air and moisture but permit rotation of the glass tube, an inner segment of the caps and glass tube being disposed in the channel of the base, an outer segment of the caps and glass tube extending outwardly through the slot whereby the tube may be directly rotated from the front of the plate by the finger of the operator.

2. In a hygrometer, a backing strip, upper and lower spacing strips mounted on the backing, a plate mounted on the spacing strips and having a slot, a cylindrical chart for translating differences in temperature degrees into humidity readings, a transparent cylinder housing the chart, a pair of knurled flanged caps sealed to the respective ends of the housing and each having an axial bore, pivot pins mounted on the respective spacing strips and extending into the bores and substantially sealing said bores while providing bearings permitting rotation of the cylinder on an axis parallel to said plate, a portion of the caps and said cylinder extending outwardly through the slot in the plate, a rod mounted on the plate in parallel relation to the axis of the cylinder and a pointer slidably mounted on the rod and overlying the chart.

3. In a hygrometer, a support, a plate operatively mounted on the support in spaced relation thereto and having a slot, a cylindrical chart operatively mounted on the support and rotatable about the axis of the cylinder and extending partially into said slot, a semi-cylindrical rod having a flat face and mounted on the plate in parallelism with the axis of said chart, with the flat face in substantial parallelism with the plane of said plate, a pointer having a pair of legs each of which has an aperture to receive the rod and each leg terminating in a spring arm frictionally engaging the flat face of the rod on the opposite side of the rod from said pointer to maintain the pointer in a predetermined angular relation to the plate, said pointer being manually movable upon said rod against the frictional resistance of said spring arms, said pointer having a portion overlying the cylindrical chart extended into the slot in said plate.

4. In a hygrometer, a plate having a slot of uniform width throughout the major portion of its length, said slot having a symmetrical enlarged end, a cylindrical chart including a cap having a knurled flange, said cap being symmetrical relative to the chart, pivots for the chart behind the plate, said chart journalled on said pivots with a longitudinal segment extending into the slot and with a segment of the knurled flange extending into the enlarged end of the slot and extending in front of the plate through the enlarged end of the slot so that the chart may be operatively rotated in front of the plate by manual manipulation of the knurled flange.

JOHN LEONARD SCHWARTZ.